United States Patent
Zejda et al.

(10) Patent No.: US 11,036,827 B1
(45) Date of Patent: Jun. 15, 2021

(54) SOFTWARE-DEFINED BUFFER/TRANSPOSER FOR GENERAL MATRIX MULTIPLICATION IN A PROGRAMMABLE IC

(71) Applicant: Xilinx, Inc., San Jose, CA (US)

(72) Inventors: Jindrich Zejda, Saratoga, CA (US); Elliott Delaye, San Jose, CA (US); Yongjun Wu, Cupertino, CA (US); Aaron Ng, San Jose, CA (US); Ashish Sirasao, San Jose, CA (US); Khang K. Dao, San Jose, CA (US)

(73) Assignee: XILINX, INC., San Jose, CA (US)

( * ) Notice: Subject to any disclaimer, the term of this patent is extended or adjusted under 35 U.S.C. 154(b) by 166 days.

(21) Appl. No.: 15/786,346

(22) Filed: Oct. 17, 2017

(51) Int. Cl.
  *G06F 17/16* (2006.01)
  *G06F 7/78* (2006.01)
  *G06F 9/30* (2018.01)

(52) U.S. Cl.
  CPC .............. *G06F 17/16* (2013.01); *G06F 7/78* (2013.01); *G06F 9/30032* (2013.01)

(58) Field of Classification Search
  CPC ............. G11C 16/102; G06F 16/24568; G06F 12/0893; G06F 12/0646; G06N 20/00; G06N 3/04
  USPC ............................. 712/34, 35, 219; 708/607
  See application file for complete search history.

(56) References Cited

U.S. PATENT DOCUMENTS

| 4,903,231 | A  | * | 2/1990  | Artieri ........................ G06F 7/78 |
|           |    |   |         |                                    711/1 |
| 6,346,825 | B1 |   | 2/2002  | Pang et al. |
| 6,804,771 | B1 | * | 10/2004 | Jung .................... G06F 9/30032 |
|           |    |   |         |                                    711/157 |
| 8,626,815 | B1 | * | 1/2014  | Langhammer .......... G06F 17/16 |
|           |    |   |         |                                    708/400 |
| 10,031,846| B1 | * | 7/2018  | Finn ......................... G06F 7/727 |
| 2011/0286528 | A1 | * | 11/2011 | Thomas ................... H03M 7/40 |
|           |    |   |         |                                    375/240.24 |
| 2014/0133246 | A1 | * | 5/2014  | Kumar ................. G11C 7/1069 |
|           |    |   |         |                                    365/189.02 |

(Continued)

OTHER PUBLICATIONS

Akesson, Benny, "An introduction to SDRAM and memory controllers," downloaded Sep. 25, 2017 from http://www.es.ele.tue.nl/premadona/files/akesson01.pdf, pp. 1-30, Eindhoven University of Technology, Eindhoven, The Netherlands.

(Continued)

*Primary Examiner* — Shawn Doman
(74) *Attorney, Agent, or Firm* — Patterson + Sheridan, LLP

(57) ABSTRACT

Methods and apparatus are described for simultaneously buffering and reformatting (e.g., transposing) a matrix for high-speed data streaming in general matrix multiplication (GEMM), which may be implemented by a programmable integrated circuit (IC). Examples of the present disclosure increase the effective double data rate (DDR) memory throughput for streaming data into GEMM digital signal processing (DSP) engine multifold, as well as eliminate slow data reformatting on a host central processing unit (CPU). This may be accomplished through software-defined (e.g., C++) data structures and access patterns that result in hardware logic that simultaneously buffers and reorganizes the data to achieve linear DDR addressing.

20 Claims, 9 Drawing Sheets

(56) References Cited

U.S. PATENT DOCUMENTS

2018/0189057 A1* 7/2018 Werner ................ G06F 9/3001

OTHER PUBLICATIONS

Chetlur, Sharan et al., "cuDNN: Efficient Primitives for Deep Learning," submitted Oct. 3, 2014, pp. 1-9, https://arxiv.org/pdf/1410.0759.pdf, Cornell University Library.

Di Carlo, Stefano et al., "An Area-Efficient 2-D Convolution Implementation on FPGA for Space Applications," Proc. of the 2011 IEEE 6th International Design & Test Workshop, Dec. 11, 2011, pp. 88-92, IEEE, Piscataway, New Jersey, USA.

Gysel, Philipp, "Ristretto: Hardware-Oriented Approximation of Convolutional Neural Networks," May 20, 2016, pp. 1-73, https://arxiv.org/abs/1605.06402, Cornell University Library.

Khronos, "clSetKernelArg," downloaded Sep. 22, 2017 from https://www.khronos.org/registry/OpenCL/sdk/1.0/docs/man/xhtml/clSetKernelArg.html, copyright 2007, pp. 1-4, Khronos Group, Beaverton, Oregon, USA.

Krizhevsky, Alex et al., "ImageNet Classification with Deep Convolutional Neural Networks," Proc. of the 12th International Conference on Neural Processing Systems, Dec. 3, 2012, pp. 1097-1105, ACM Digital Library, www.acm.org.

Mathworks, "im2col," dowloaded Sep. 22, 2017 from https://www.mathworks.com/help/images/ref/im2col.html?searchHighlight=im2col&s_tid=doc_srchtitle, pp. 1-3.

Saxena, Abhineet, "Convolutional Neural Networks (CNNs): An Illustrated Explanation," Jun. 20, 2016, downloaded Sep. 25, 2017 from http://xrds.acm.org/blog/2016/06/convolutional-neural-networks-cnns-illustrated-explanation/, pp. 1-15.

Shaaban, Muhammed, "Systolic Architectures," Mar. 11, 2003, Kate Gleason College of Engineering, Rochester Institue of Technology, Rochester, New York, USA.

Stanford, "CS231n Convolutional Neural Networks for Visual Recognition," downloaded Sep. 25, 2017 from http://cs231n.stanford.edu/, pp. 1-23, Stanford University, Stanford, California, USA.

Warden, Pete, "Why GEMM is at the heart of deep learning," Apr. 20, 2015, pp. 1-9, downloaded from https://petewarden.com/2015/04/20/why-gemm-is-at-the-heart-of-deep-learning/.

Wikipedia, "Convolutional neural network," Sep. 20, 2017, pp. 1-13, downloaded from https://en.wikipedia.org/wiki/Convolutional_neural_network.

Wikipedia, "Deep learning," Sep. 24, 2017, pp. 1-13, downloaded from https://en.wikipedia.org/wiki/Deep_learning.

Wikipedia, "Matrix Multiplication," Sep. 20, 2017, pp. 1-19, downloaded from https://en.wikipedia.org/wiki/Matrix_multiplication.

Wikipedia, "Multiprocessing," May 10, 2017, pp. 1-4, dowloaded from https://en.wikipedia.org/wiki/Multiprocessing.

Wikipedia, "Producer-consumer problem," Sep. 7, 2017, pp. 1-9, downloaded from https://en.wikipedia.org/wiki/Producer%E2%80%93consumer_problem.

Wikipedia, "Row- and colum-major order," Aug. 23, 2017, pp. 1-5, downloaded from https://en.wikipedia.org/wiki/Row-_and_column-major_order.

Wikipedia, "Systolic array," Mar. 22, 2017, pp. 1-5, downloaded from https://en.wikipedia.org/wiki/Systolic_array.

Wikipedia, "Very long instruction word," Jul. 13, 2017, pp. 1-3, downloaded from https://en.wikipedia.org/wiki/Very_long_instruction_word.

Xilinx, "Smarter Data Center," downloaded Sep. 22, 2017 from https://www.xilinx.com/applications/data-center.html, pp. 1-4, Xilinx, Inc., San Jose, California, USA.

Xilinx, "SDSoC Development Environment," downloaded Sep. 22, 2017 from https://www.xilinx.com/products/design-tools/software-zone/sdsoc.html, pp. 1-16, Xilinx, Inc., San Jose, California, USA.

Xilinx, "UltraScale Architecture DSP Slice User Guide," UG579 (v1.3), Nov. 24, 2015, pp. 1-74, Xilinx, Inc., San Jose, California, USA.

Xilinx, "Vivado High-Level Synthesis," downloaded Sep. 22, 2017 from https://www.xilinx.com/products/design-tools/vivado/integration/esl-design.html, pp. 1-2, Xilinx, Inc., San Jose, California, USA.

Xilinx, "Deep Learning with INT8 Optimization on Xilinx Devices," WP486 (v1.0.1), Apr. 24, 2017, pp. 1-11, Xilinx, Inc., San Jose, California, USA.

Xilinx, "Implementing Memory Structures for Video Processing in the Vivado HLS Tool," XAPP793 (v1.0), Sep. 20, 2012, pp. 1-8, Xilinx, Inc., San Jose, California, USA.

Xilinx, "Two-Dimensional Linear Filtering," XAPP933 (v1.1), Oct. 23, 2007, pp. 1-8, Xilinx, Inc., San Jose, California, USA.

\* cited by examiner

SOFTWARE-DEFINED BUFFER/TRANSPOSER FOR GENERAL MATRIX MULTIPLICATION IN A PROGRAMMABLE IC

TECHNICAL FIELD

Examples of the present disclosure generally relate to electronic circuits and, in particular, to a software-defined buffer/transposer for general matrix multiplication implemented in a programmable integrated circuit (IC).

BACKGROUND

Machine learning is the science of inducing computing systems to act without being explicitly programmed. Classical machine learning includes various clustering and classification techniques, including K-means clustering, linear and logistic regressions, stochastic gradient decent, association rule learning, and the like. Deep learning is a newer frontier in machine learning. Deep learning is a class of machine learning algorithms that uses multiple layers of nonlinear processing units for feature extraction and transformation. Deep learning algorithms may be unsupervised (e.g., pattern analysis) or supervised (e.g., classification). The deep learning algorithm may be implemented using layers of an artificial neural network (ANN) (referred to herein as a "neural network").

In general, a neural network is a collection of nodes (i.e., the "neurons") that are connected (e.g., in a graph). A node in a neural network may compute a sum of weighted inputs and may add an optional bias to the sum. The output of the node is a function of the final sum (referred to as an "activation function"). Example activation functions include the sigmoid function, the hyperbolic tangent (tanh) function, the Rectified Linear Unit (ReLU) function, and the identity function. Neural network models are often organized into layers of nodes, which define a specific topology, and corresponding weights and biases. The weights and biases are referred to as network parameters.

In general, a neural network includes an input layer and an output layer and may optionally include one or more hidden layers between the input and output layers. A neural network used in deep learning applications typically includes many hidden layers, which gives rise to the term deep neural network (DNN). The layers of a neural network may be densely connected (e.g., each node in a layer is fully connected to all nodes in a previous layer) or sparsely connected (e.g.; each node in a layer is connected to only a portion of the nodes in a previous layer). A convolutional neural network (CNN) is a type of DNN that includes one or more sparsely connected layers, referred to as convolutional layers. A CNN is well-suited for processing image or video data. Other types of DNNs include recurrent neural network (RNNs), which are well-suited for processing speech and text data.

SUMMARY

Examples of the present disclosure generally relate to techniques and apparatus for simultaneously buffering and transposing a matrix for general matrix multiplication, which may be implemented by a programmable integrated circuit (IC).

One example of the present disclosure is a method for processing a matrix in hardware. The method generally includes buffering, in a circuit, an input data stream of elements of the matrix according to a first data format; reformatting, in the circuit, the input data stream to generate an output data stream having a second data format, different from the first data format, wherein the reformatting occurs concurrently with the buffering; and outputting the output data stream from the circuit.

Another example of the present disclosure is an electronic circuit. The electronic circuit generally includes a reformatting circuit and a compute circuit comprising a compute array, wherein an input of the compute array is coupled to an output of the reformatting circuit. The reformatting circuit is generally configured to buffer an input data stream of elements of a matrix according to a first data format; to reformat the input data stream to generate an output data stream having a second data format, different from the first data format, wherein the reformatting is configured to occur concurrently with the buffering; and to output the output data stream to the compute array. The compute circuit may be implemented by a digital signal processing (DSP) circuit, for example.

Yet another example of the present disclosure provides an apparatus for processing a matrix. The apparatus generally includes means for buffering an input data stream of elements of the matrix according to a first data format; means for reformatting the input data stream to generate an output data stream having a second data format, different from the first data format, wherein the means for reformatting operates concurrently with the means for buffering; and means for outputting the output data stream.

These and other aspects may be understood with reference to the following detailed description.

BRIEF DESCRIPTION OF THE DRAWINGS

So that the manner in which the above-recited features of the present disclosure can be understood in detail, a more particular description of the disclosure, briefly summarized above, may be had by reference to example implementations, some of which are illustrated in the appended drawings. It is to be noted, however, that the appended drawings illustrate only typical example implementations and are therefore not to be considered limiting of its scope, for the disclosure may admit to other equally effective examples.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
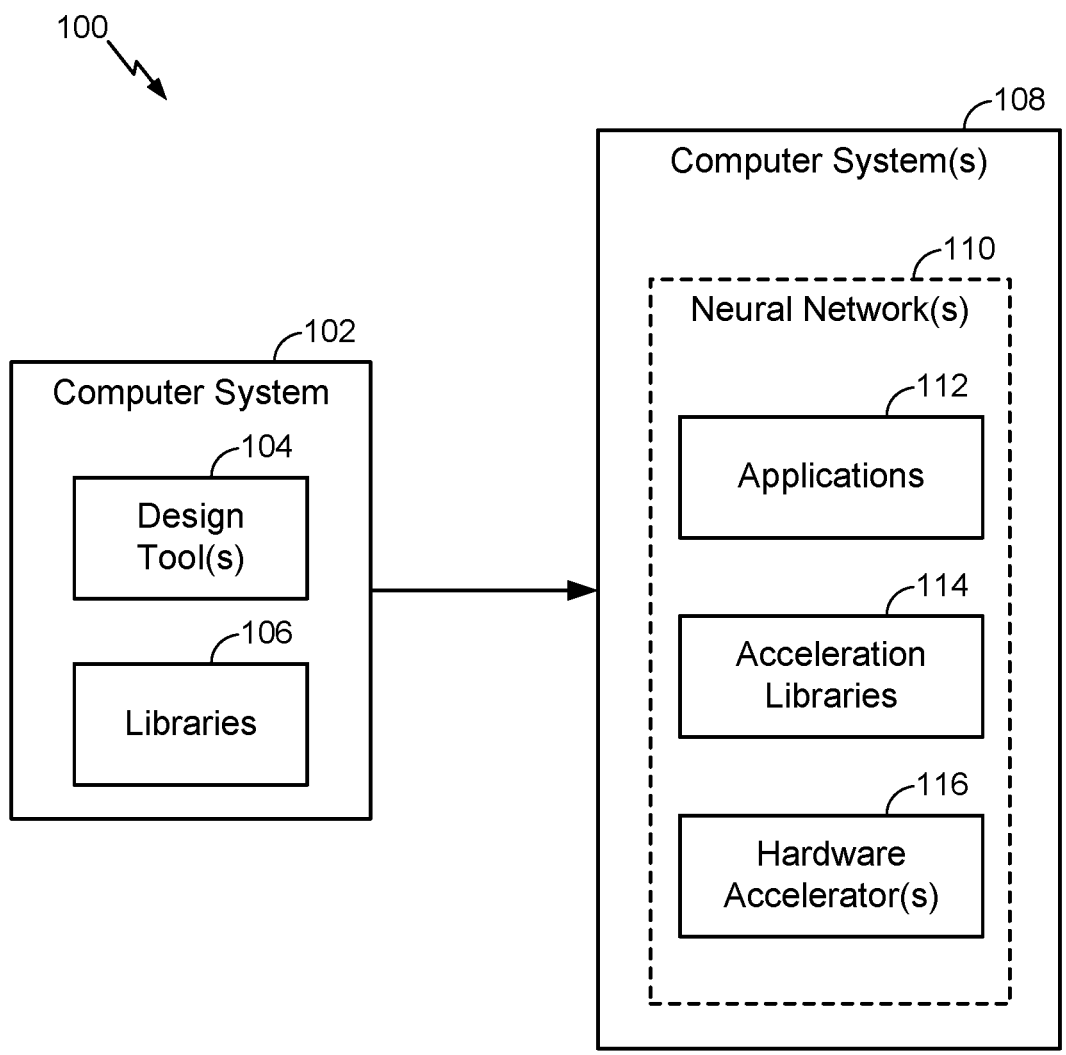
FIG. 1 is a block diagram depicting a system for implementing artificial neural networks, in accordance with an example of the present disclosure.

Examples of the present disclosure provide techniques and apparatus for simultaneously buffering and reformatting (e.g., transposing) a matrix for fast massively parallel general matrix multiplication (GEMM), which may be implemented by a programmable integrated circuit (IC). Examples of the present disclosure increase the effective double data rate (DDR) memory throughput for streaming data into GEMM digital signal processing (DSP) engine multifold, as well as eliminate slow data reformatting on a host central processing unit (CPU). This may be accomplished through software-defined (e.g., C++) data structures and access patterns that result in hardware logic that simultaneously buffers and reorganizes the data to achieve linear DDR addressing.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples, even if not so illustrated or if not so explicitly described.

Example System for Artificial Neural Network Implementation

FIG. 1 is a block diagram depicting a system 100 for implementing neural networks, in accordance with an example of the present disclosure. The system 100 includes a computer system 102 and one or more computer systems 108. The computer system 102 includes conventional computing components configured to execute software that provides one or more design tools 104. Each computer system 108 may execute one or more neural networks 110. The neural network(s) 110 may be implemented using applications 112, acceleration libraries 114, and/or one or more hardware accelerators 116.

For some examples, the hardware accelerator(s) 116 include programmable integrated circuits (ICs), such as field programmable gate arrays (FPGAs). The acceleration libraries 114 provide application programming interfaces (APIs) to interface with the hardware accelerator(s) 116. The acceleration libraries 114 may also include libraries that provide neural network functions, including predefined and optimized implementations of neural network layers and other types of neural network structures. Thus, the neural network(s) 110 may include both hardware portions (implemented in the hardware accelerator(s) 116) and software portions (implemented in the acceleration libraries 114). The applications 112 invoke the APIs of the acceleration libraries 114 to program and control the hardware accelerator(s) 116 to implement the neural network(s) 110.

A designer interacts with the design tool(s) 104 to define the neural network(s) 110. The design tool(s) 104 may generate files for programming the hardware accelerator(s) 116 (e.g., configuration bitstreams for FPGAs), files that provide the acceleration libraries 114, and files that provide the applications 112. The designer may define the hardware portions of the neural network(s) 110 using a register transfer language (RTL) or using a programming language, such as C, C++, OpenCL, and the like, or a combination of RTL and programmable language(s). The user may define the software portions of the neural network(s) 110 using a programming language, such as C, C++, OpenCL, etc. The design tool(s) 104 compile the software-defined neural networks to generate files for programming the hardware accelerator(s) 116 and library files for the acceleration libraries 114. The designer may make use of libraries 106 that provide class libraries, template libraries, and the like to assist in developing the hardware and software portions of the neural network(s) 110.

A user may define the applications 112 using a programming language (e.g., C, C++, Python, etc.). The user may make use of neural network frameworks and libraries, such as Caffe, TensorFlow, MXNet, and the like.

Figure 2:
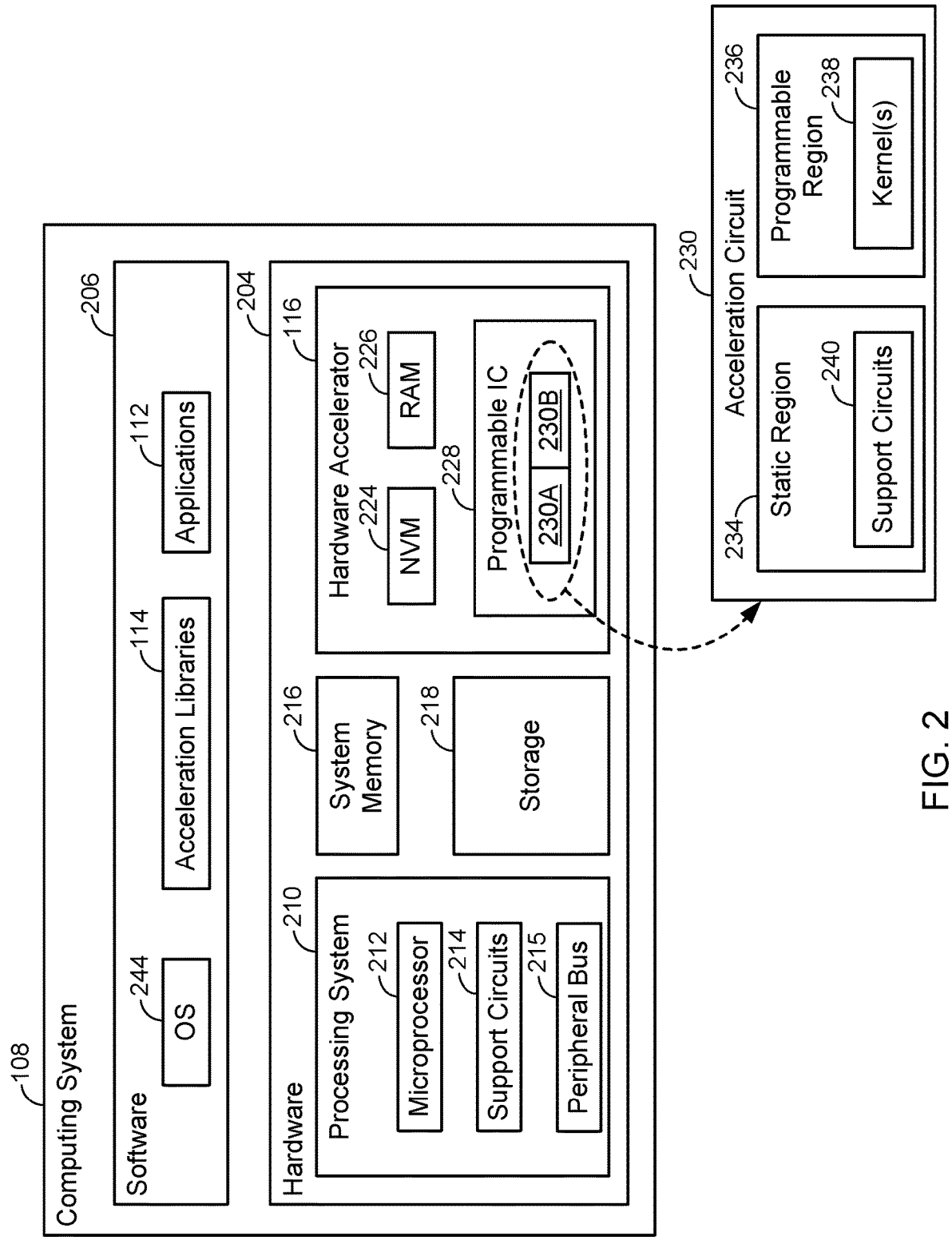
FIG. 2 is a block diagram depicting a computing system, in accordance with an example of the present disclosure.

FIG. 2 is a block diagram depicting a computer system 108, in accordance with an example of the present disclosure. The computer system 108 includes hardware 204 and software 206 executing on the hardware 204. The hardware 204 includes a processing system 210, system memory 216, storage devices ("storage 218"), and a hardware accelerator 116. The software 206 includes an operating system (OS) 244, the acceleration libraries 114, and the applications 112.

The processing system 210 includes a microprocessor 212, support circuits 214, and a peripheral bus 215. The microprocessor 212 may be any type of general-purpose central processing unit (CPU), such as an x86-based processor, ARM®-based processor, or the like. The microprocessor 212 may include one or more cores and associated circuitry (e.g., cache memories, memory management units (MMUs), interrupt controllers, etc.). The microprocessor 212 is configured to execute program code that performs one or more operations described herein and which may be stored in the system memory 216 and/or the storage 218. The support circuits 214 include various devices that cooperate with the microprocessor 212 to manage data flow between the microprocessor 212, the system memory 216, the storage 218, the hardware accelerator 116, or any other peripheral device. For example, the support circuits 214 may include a chipset (e.g., a north bridge, south bridge, platform host controller, etc.), voltage regulators, firmware (e.g., a BIOS), and the like. The support circuits 214 manage data flow between the microprocessor 212 and the peripheral bus 215, to which various peripherals, such as the hardware accelerator 116, are connected. In some examples, the microprocessor 212 may be a system-in-package (SiP), system-on-chip (SoC), or the like, which absorbs all or a substantial portion of the functionality of the chipset (e.g., north bridge, south bridge, etc.). The peripheral bus may implement an expansion bus standard, such as Peripheral Component Interconnect Express (PCIe). In the example of FIG. 2, the processing system 210 is shown separate from the hardware accelerator 116. In other examples discussed further below, the processing system 210 and the hardware accelerator 116 may be implemented on the same IC (e.g., using an SoC).

The system memory 216 is a device allowing information, such as executable instructions and data, to be stored and retrieved. The system memory 216 may include, for example, one or more random access memory (RAM) modules, such as double data rate (DDR) dynamic RAM (DRAM). The storage 218 includes local storage devices (e.g., one or more hard disks, flash memory modules, solid state disks, and optical disks) and/or a storage interface that enables the computer system 108 to communicate with one or more network data storage systems. The hardware 204 may include various other conventional devices and peripherals of a computing system, such as graphics cards, universal serial bus (USB) interfaces, and the like.

The hardware accelerator 116 includes a programmable IC 228, a non-volatile memory (NVM) 224, and RAM 226. The programmable IC 228 may be an FPGA or the like or an SoC having an FPGA or the like. The NVM 224 may include any type of non-volatile memory, such as flash memory or the like. The RAM 226 may include DDR DRAM or the like. The programmable IC 228 is coupled to the NVM 224 and the RAM 226. The programmable IC 228 is also coupled to the peripheral bus 215 of the processing system 210.

The OS 244 may be any commodity operating system known in the art, such as such as Linux®, Microsoft Windows®, Mac OS®, or the like. The acceleration libraries 114 include drivers and libraries that provide APIs for command and control of the hardware accelerator 116. The applications 112 include software executing on the microprocessor 212 that invokes the APIs of the acceleration libraries 114 to implement neural network(s).

In operation, the programmable IC 228 is configured with an acceleration circuit 230. For some examples, the acceleration circuit 230 may be a neural network accelerator or any of other various suitable types of hardware accelerators. The acceleration circuit 230 generally includes a base platform 230A and a kernel 230B. For example, the acceleration circuit 230 may be implemented using a static region 234 and a programmable region 236. The static region 234 includes support circuits 240 for providing an interface to the peripheral bus 215, the NVM 224, and the RAM 226. The programmable region 236 may include one or more kernel circuits ("kernel(s) 238"). The base platform 230A is implemented using the static region 234, and the kernel 230B is implemented using the programmable region 236. In another example, the base platform 230A may also be implemented using a portion of the programmable region 236. Thus, in some examples, the programmable region 236 also includes some interface circuits. In some examples, the acceleration circuit 230 may include more than one programmable region 236, each of which may be individually configured with kernel(s) 238.

The static region 234 is "static" in that the circuitry thereof remains constant across reconfigurations of the programmable region 236. In an example, the support circuits 240 include PCIe endpoint circuits, a direct memory access (DMA) controller, interconnects, a memory controller, a memory interface circuit (e.g., a DDR interface), decoupler circuits (to support partial reconfiguration), flash programmer, debug circuits, and the like. In some examples, the programmable region 236 does not include any of the support circuits 240. In other examples, some support circuits are implemented in the programmable region 236. In such a case, the programmable region 236 may be referred to as an "expanded programmable region." In either case, in one example, some support circuits 240 are typically present in the static region 234, such as the PCIe circuits and the DMA circuits.

Figure 3:
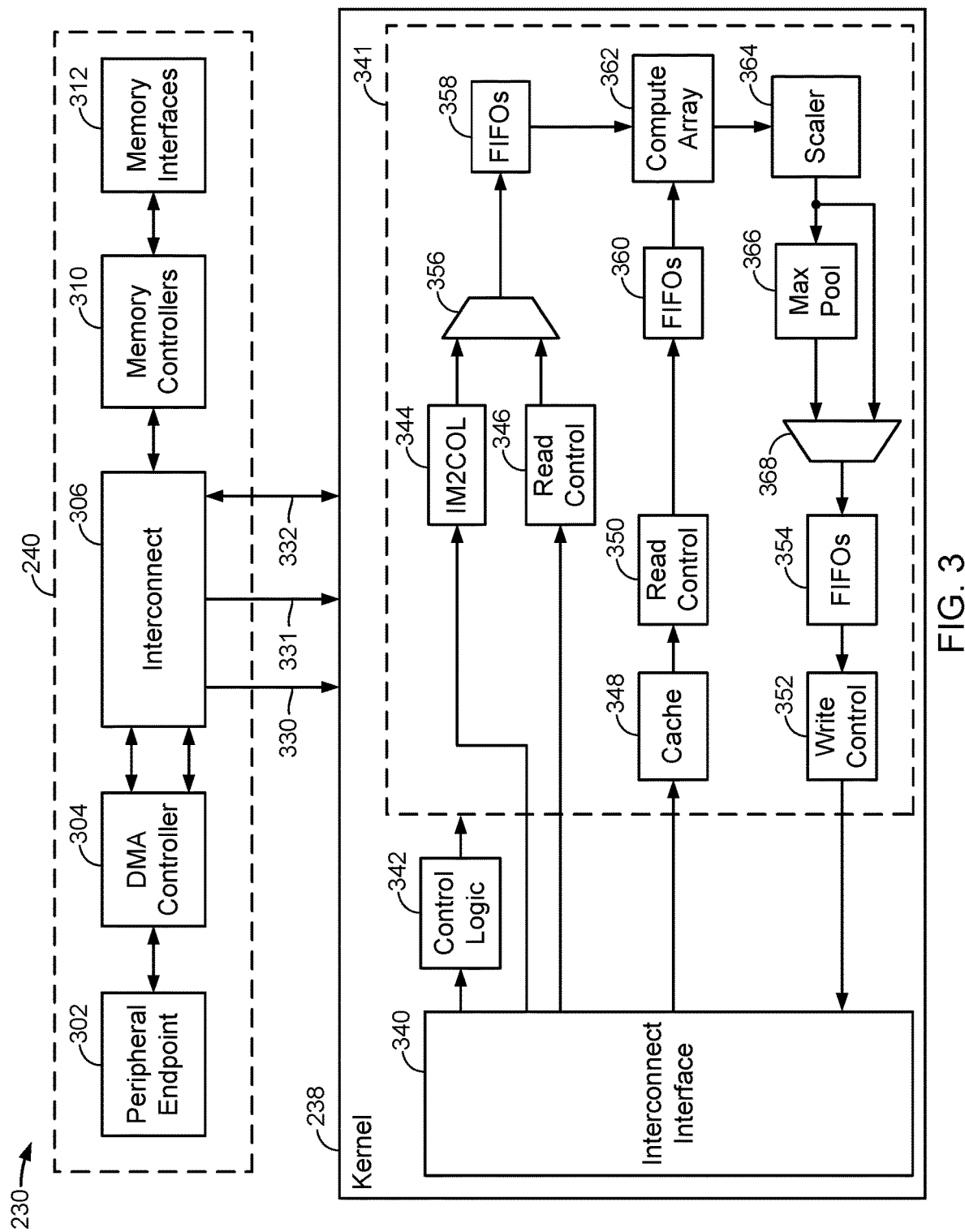
FIG. 3 is a block diagram depicting an acceleration circuit, in accordance with an example of the present disclosure.

FIG. 3 is a block diagram depicting an acceleration circuit 230, in accordance with an example of the present disclosure. The acceleration circuit 230 includes the support circuits 240 and a kernel 238. In the example, the support circuits 240 include a peripheral endpoint circuit ("peripheral endpoint 302"), a PCIe DMA controller 304, interconnect circuits ("interconnect 306"), memory controllers 310, and memory interfaces 312. The support circuits 240 may include other circuits, which are omitted for clarity (e.g., decoupler circuits, debug circuits, etc.). The peripheral endpoint 302 (e.g., a PCIe endpoint circuit) provides a physical interface to the peripheral bus 215. The PCIe DMA controller 304 facilitates DMA operations to the RAM 226 and the kernel 238. The interconnect 306 couples the PCIe DMA controller 304 to the memory controllers 310 and to the kernel 238. The memory controllers 310 are coupled to the memory interfaces 312. The memory interfaces 312 are coupled to the RAM 226.

In operation, the acceleration libraries 246 may access the RAM 226 directly through the PCIe DMA controller 304. The acceleration libraries 246 may also access the kernel 238 through the PCIe DMA controller 304. The kernel 238 may access the RAM 226 through the memory controllers 310. Data may be exchanged between the software 206 and the kernel 238 using DMA operations between the system memory 216 and the RAM 226.

In the example, the kernel 238 uses interfaces 330, 331, and 332 to communicate with the interconnect 306. In particular, these interfaces include a first read interface 330, a second read interface 331, and a read/write interface 332. For example, the read interface 330 may be used as a control interface for controlling the kernel 238. The read interface 331 may be used to read from the RAM 226 through a first one of the memory interfaces 312. The read/write interface 332 may be used to read and write from the RAM 226 through a second one of the memory interfaces 312.

The kernel 238 includes an interconnect interface 340, control logic 342, and processing circuits 341. The processing circuits 341 may include an IM2COL circuit ("IM2COL 344"), a read control circuit ("read control 346"), a multiplexer 356, first-in-first-out circuits ("FIFOs 358"), a compute array 362, a scaler circuit ("scaler 364"), a max pool circuit ("max pool 366"), a multiplexer 368, FIFOs 354, a 3-D partitioning block order unit (not shown), a write control circuit ("write control 352"), a write cache 348, a read control circuit ("read control 350"), read caches (not shown), and FIFOs 360. The block order unit may provide key inputs to read and write control and cache behavior. The interconnect interface 340 is coupled to the interfaces 330, 331, and 332, the control logic 342, and the processing circuits 341. The interconnect interface 340 may include switches, clock converters, and the like to facilitate communication between the control logic 342 and the interface 330, as well as between the processing circuits 341 and the interfaces 331 and 332. The compute array 362 may be implemented, for example, by a digital signal processor (DSP), dedicated floating point units, vector floating point or integer units, look-up tables (LUTs), or other compute hardware such as low-precision hard arithmetic logic units (ALUs) or double/complex blocks.

In the example, the interconnect interface 340 is coupled to inputs of the IM2COL circuit 344, the read control circuit 346, and the cache 348, as well as to an output of the write control circuit 352. Outputs of the IM2COL circuit 344 and the read control circuit 346 are coupled to inputs of the multiplexer 356. An output of the multiplexer 356 is coupled to an input of the FIFOs 358. An output of the FIFOs 358 is coupled to a first input of the compute array 362. An output of the cache 348 is coupled to an input of the read control circuit 350. An output of the read control circuit 350 is coupled to an input of the FIFOs 360. An output of the FIFOs 360 is coupled to a second input of the compute array 362. An output of the compute array 362 is coupled to an input of the scaler 364. An output of the scaler 364 is coupled to an input of the max pool circuit 366 and to an input of the multiplexer 368. An output of the max pool circuit 366 is coupled to another input of the multiplexer 368. An output of the multiplexer 368 is coupled to an input of the FIFOs 354, and an output of the FIFOs 354 is coupled to an input of the write control circuit 352.

In operation, the compute array 362 performs matrix multiplication operations for implementing a neural network. The inputs of the compute array 362 receive input activation matrices from the FIFOs 358 and weight matrices from the FIFOs 360. To implement fully connected layers or general purpose (GEMM), the input activation matrices may be read directly from the RAM 226 using the block order unit, caches, and read control circuit 346. Alternatively, to perform convolution, for example, the input activations may be read from the RAM 226 and processed by the IM2COL circuit 344 for input to the compute array 362. Embodiments of the IM2COL circuit 344 are described below. Weight matrices may be read from the RAM 226 by the block order unit and read control circuit 350 and cached in cache 348. The scaler 364 may scale the output of the compute array 362. The max pool circuit 366 may implement a max pooling function on the scaled output of the scaler 364. In one example, the max pool circuit 366 is implemented using configurable logic blocks (CLBs) or other configurable logic. Either the output of the max pool circuit 366 or the scaler 364 may be stored in the FIFOs 354. The write control circuit 352 writes data in the FIFOs to the RAM 226. The control logic 342 controls the various circuits in the processing circuits 341, such as the IM2COL circuit 344, the 3-D partitioning block order unit, the read control circuit 346, the multiplexers 356 and 368, the read control circuit 350, the scaler 364, the max pool circuit 366, and the write control circuit 352.

Figure 4:
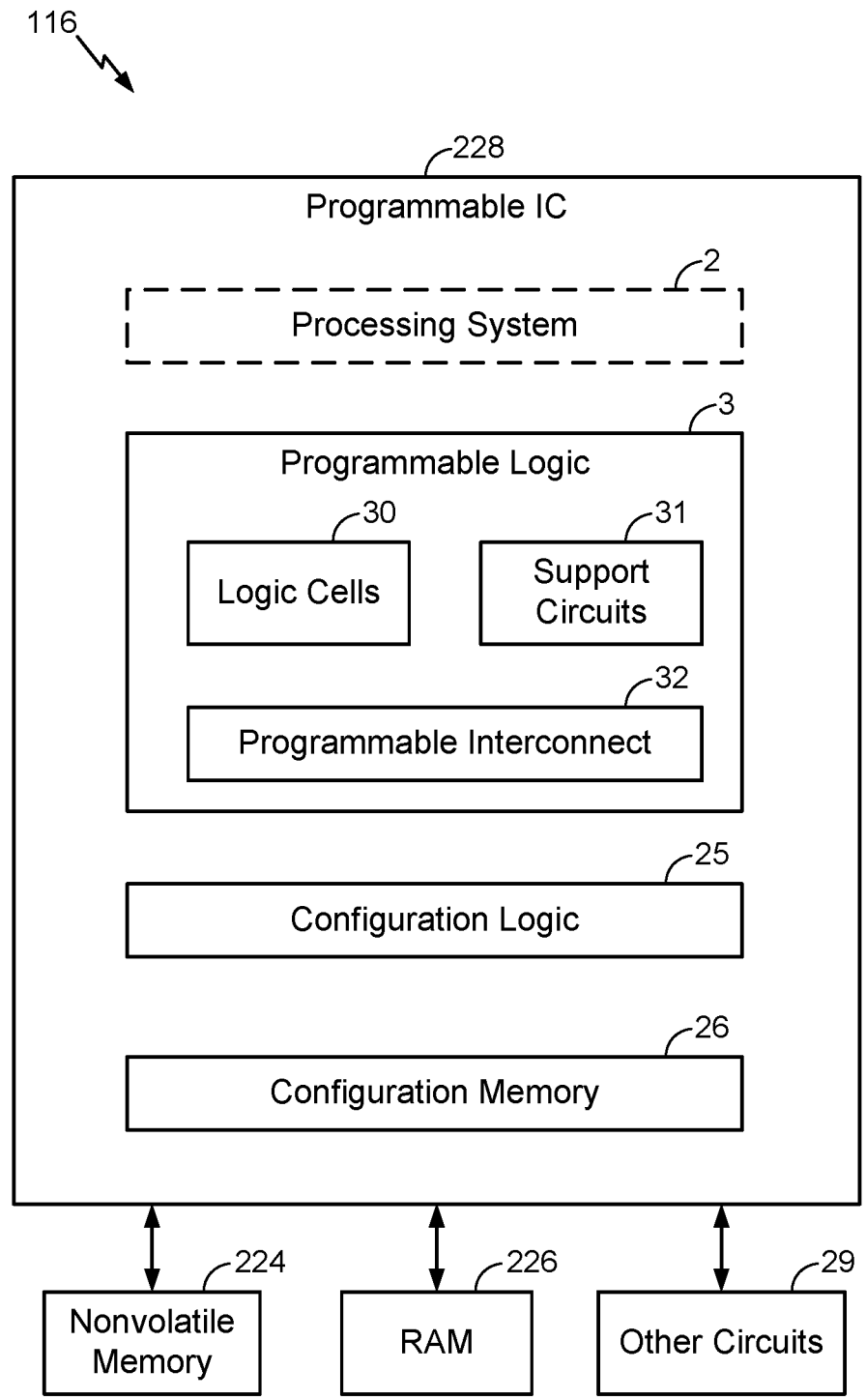
FIG. 4 is a block diagram depicting a programmable integrated circuit (IC), in accordance with an example of the present disclosure.

FIG. 4 is a block diagram depicting a programmable IC 228, in accordance with an example of the present disclosure. The programmable IC 228 includes programmable logic 3, configuration logic 25, and configuration memory 26. The programmable IC 228 may be coupled to external circuits, such as the NVM 224, the RAM 226, and other circuits 29. The programmable logic 3 includes logic cells 30, support circuits 31, and a programmable interconnect 32. The logic cells 30 include circuits that can be configured to implement general logic functions of a plurality of inputs. The support circuits 31 include dedicated circuits, such as transceivers, input/output blocks, digital signal processors, memories, and the like. The logic cells and the support circuits 31 may be interconnected using the programmable interconnect 32. Information for programming the logic cells 30, for setting parameters of the support circuits 31, and for programming the programmable interconnect 32 is stored in the configuration memory 26 by the configuration logic 25. The configuration logic 25 may obtain the configuration data from the nonvolatile memory 224 or any other source (e.g., the RAM 226 or from the other circuits 29).

In some examples, the programmable IC 228 includes a processing system 2. The processing system 2 may include microprocessor(s), memory, support circuits, I/O circuits, and the like. For example, the processing system 2 may include circuits similar to the processing system 210. In some examples, the processing system 2 may be used in place of the processing system 210. In this case, the entire computer system 108 may be implemented using the programmable IC 228, where the software 206 executes on the processing system 2.

Figure 5:
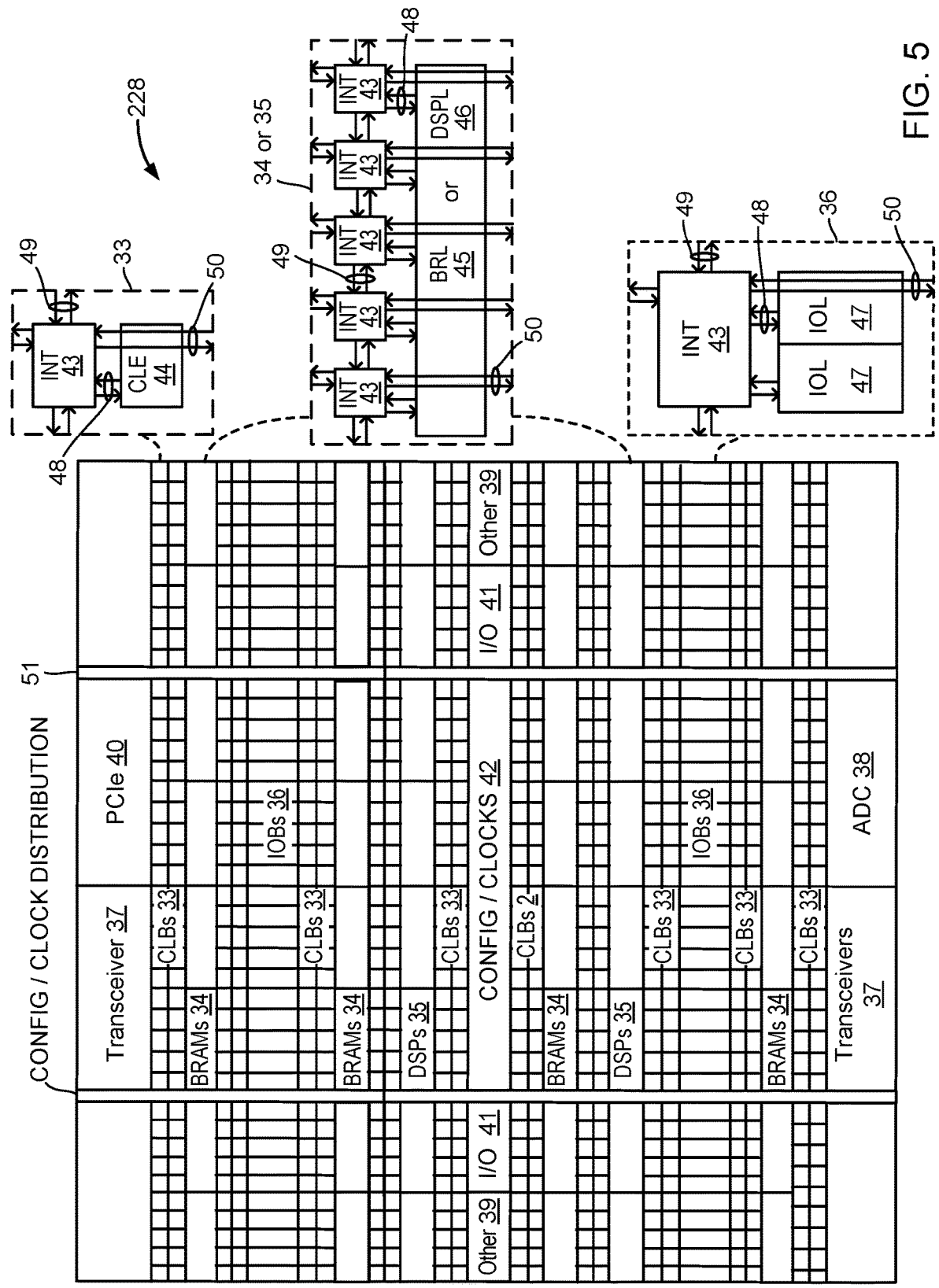
FIG. 5 illustrates a field programmable gate array (FPGA) implementation of a programmable IC, in accordance with an example of the present disclosure.

FIG. 5 illustrates an FPGA implementation of the programmable IC 228 that includes a large number of different programmable tiles including transceivers 37, configurable logic blocks ("CLBs") 33, random access memory blocks ("BRAMs") 34, input/output blocks ("IOBs") 36, configuration and clocking logic ("CONFIG/CLOCKS") 42, digital signal processing blocks ("DSPs") 35, specialized input/output blocks ("I/O") 41 (e.g., configuration ports and clock ports), and other programmable logic 39, such as digital clock managers, analog-to-digital converters, system monitoring logic, and so forth. The FPGA may also include PCIe interfaces 40, analog-to-digital converters (ADCs) 38, and the like.

In some FPGAs, each programmable tile may include at least one programmable interconnect element ("INT") 43 having connections to input and output terminals 48 of a programmable logic element within the same tile, as shown by examples included at the top of FIG. 5. Each programmable interconnect element 43 may also include connections to interconnect segments 49 of adjacent programmable interconnect element(s) in the same tile or other tile(s). Each programmable interconnect element 43 may also include connections to interconnect segments 50 of general routing resources between logic blocks (not shown). The general routing resources may include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) may span one or more logic blocks. The programmable interconnect elements 43 taken together with the general routing resources implement a programmable interconnect structure ("programmable interconnect") for the illustrated FPGA.

In an example implementation, a CLB 33 may include a configurable logic element ("CLE") 44 that may be programmed to implement user logic plus a single programmable interconnect element ("INT") 43. A BRAM 34 may include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) may also be used. A DSP tile 35 may include a DSP logic element ("DSPL") 46 in addition to an appropriate number of programmable interconnect elements. An 10B 36 may include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example of FIG. 5, a horizontal area near the center of the die is used for configuration, clock, and other control logic. Vertical columns 51 extending from this horizontal area or row are used to distribute the clocks and configuration signals across the breadth of the FPGA.

Some FPGAs utilizing the architecture illustrated in FIG. 5 include additional logic blocks that disrupt the regular columnar structure making up a large part of the FPGA. The additional logic blocks may be programmable blocks and/or dedicated logic.

Note that FIG. 5 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 5 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Example Buffer/Transposer for General Matrix Multiplication

Many engineering and scientific problems can be translated into matrix multiplication, including CNNs (with the addition of a data formatter called "IM2COL"), simple multi-layer perceptions (MLPs), and recurrent neural networks (RNNs). The host code frameworks typically use a different data format than the matrix multiplication core. Host format may be driven by API demand, such as row or column major. The accelerator format is determined by the hardware compute array architecture, such as a systolic array multiplier. Therefore matrix data may be reformatted on the host or in the accelerator. This leads to major accelerator system performance bottlenecks, as well as engineering productivity limits (e.g., the CNN formatter IM2COL is far more complex in compute-array format compared to row-major format).

Massively parallel computing (e.g., for implementing general matrix multiplication (GEMM)) typically involves a large amount of data being streamed in and out of a processing device at the rate of the compute engine (also referred to as the compute array). This processing device for massively parallel computing may include, for example, a compute circuit such as a digital signal processor (DSP), which may be implemented by a programmable IC (e.g., an FPGA), and the compute array may be implemented by a DSP array in a programmable IC (e.g., the compute array 362 in the programmable IC 228). A typical massively parallel GEMM on an FPGA may employ thousands of DSP elements and entail streaming in tens of gigabytes per second (GB/s) of input data without stalling. For maximum performance, the input/output (I/O) data flow bandwidth should match or exceed the compute throughput.

Figure 6:
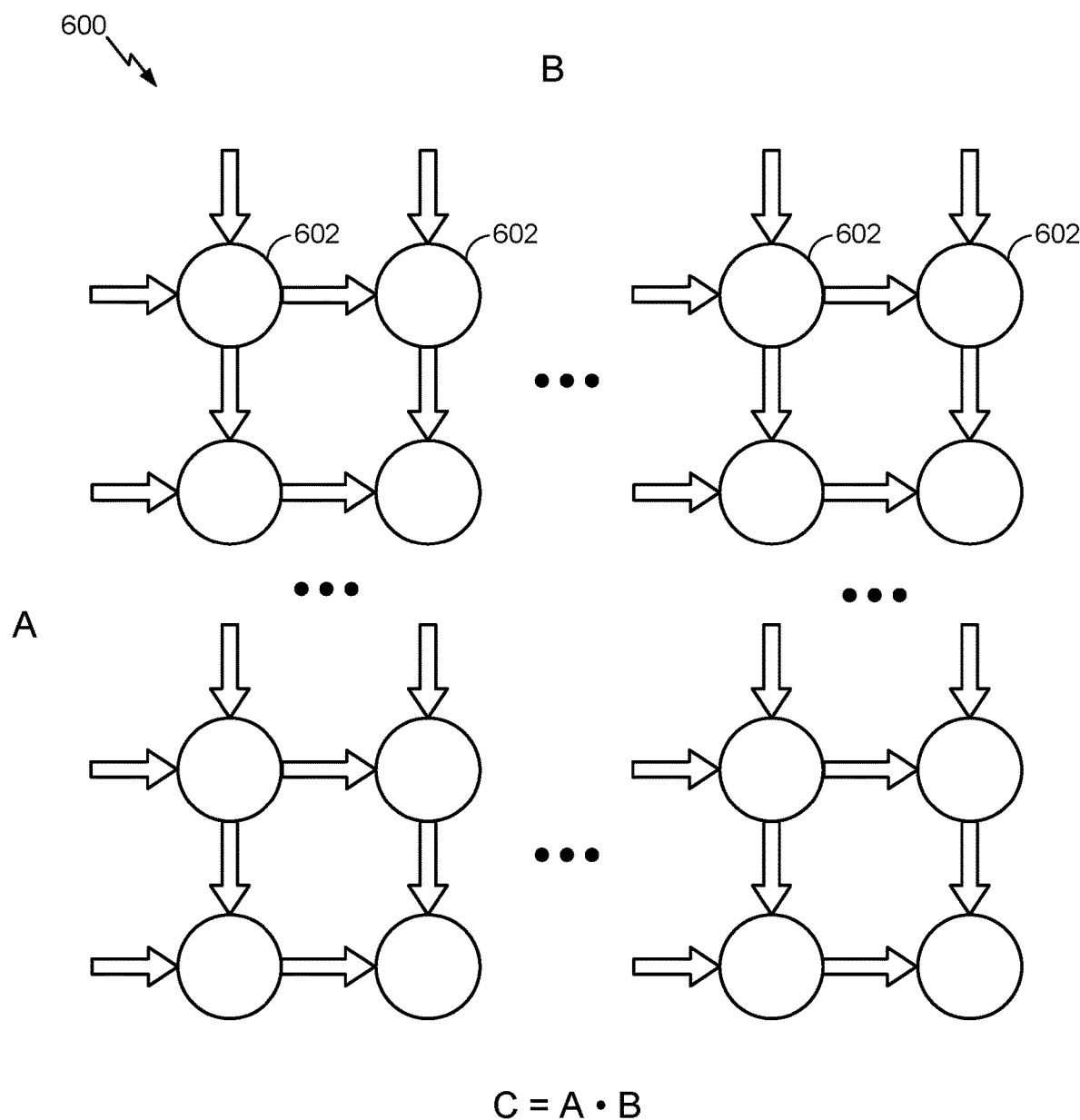
FIG. 6 illustrates an example compute array, in accordance with an example of the present disclosure.

FIG. 6 illustrates an example compute array 600, in accordance with an example of the present disclosure. The compute array 600 may have a systolic array structure of compute cores 602 suitable for use in massively parallel GEMM, for example. A compute core 602 may also be referred to as a compute element, data processing unit (DPU), cell, or node. As used herein, a systolic array generally refers to a homogeneous network of coupled DPUs. Each DPU (e.g., each compute core 602) may independently compute a partial result as a function of the data received from its upstream neighbors (e.g., to the left and/or above), store the result within the DPU itself, and pass the received data and the result downstream (e.g., to the right and/or down). For matrix multiplication, each compute core 602 may multiply two elements (one from each matrix) together, store the product, and if additional matrix elements are input to this core, add the stored product to the next multiplication result. The compute array 600 may compute matrix operations C=A*B, where columns of matrix A flow left to right and rows of matrix B flow top to bottom, with matrix C being accumulated in local memory of the individual compute cores 602 and offloaded when the calculation is done. The compute array 362 in FIG. 3 may be implemented with the compute array 600, where matrix A is a weight matrix read from the FIFOs 360 and matrix B is an input data matrix read from the FIFOs 358. For some examples, the input data matrix may be an image matrix, voice samples, or channels of data from activation functions of a previous neural network layer.

On a typical FPGA accelerator, the matrices are stored in double data rate (DDR) memory. On a typical FPGA, the number of DDR ports (e.g., ranging from 2 to 8) and their bandwidth (e.g., tens of GB/s) is far smaller than the throughput of the DSP compute elements (e.g., thousands of giga-operations per second (Gops)). Alternatively, a local distributed memory may be used for the input data, but such memory is typically limited in size.

The format of the data may also be significant, since any data movement on the host may be slow for a large volume due to cache and page misses. It may be desirable to modify typical host data format representations (e.g., a row-major matrix) for a number of reasons. First, modification of the host data format representation may satisfy the order in which a massively parallel compute engine (e.g., GEMM) expects to receive the data to be algorithmically correct. Second, the data may be reordered in an effort to speed up DDR access, whether in bursts, on the same page, or linearly (with sequential addresses).

Conventionally, the issue was addressed by either designing a separate buffer circuit (which consumes more hardware resources), reordering the data on the host (which may most likely be slower), forcing the client to provide data in a specific format (which involves a higher barrier of entry), or simply not exploiting the fast GEMM application in some areas of machine learning.

Examples of the present disclosure use a single set of hardware resources for both buffering and data transformation. Examples of the present disclosure not only reduce the resource usage and speed up the host runtime, but also preserve the full bandwidth of the GEMM compute array.

Figure 7:
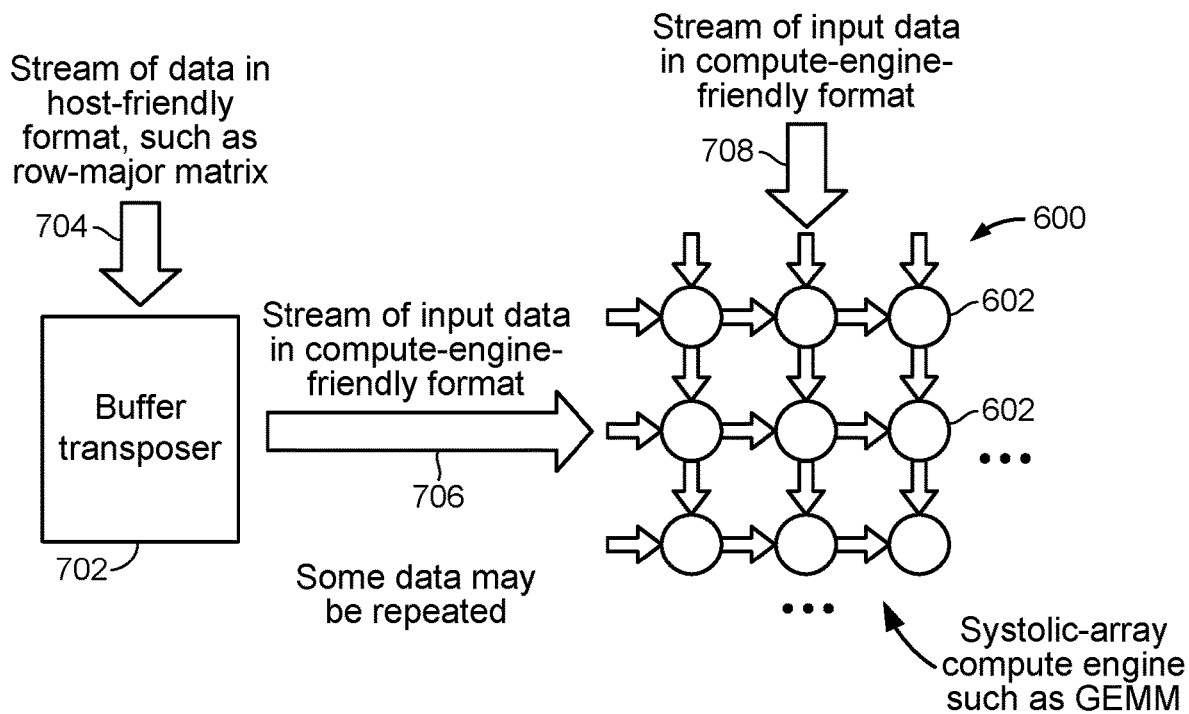
FIG. 7 illustrates an example hardware circuit for simultaneously buffering and reformatting an input stream of data, in accordance with an example of the present disclosure.

FIG. 7 illustrates an example hardware circuit for simultaneously buffering and transposing (or otherwise reformatting) an input stream of data, in accordance with an example of the present disclosure. This hardware circuit may be referred to as a buffer/transposer 702. In a massively parallel compute engine, such as systolic array GEMM, the buffer/transposer 702 of the present disclosure may be inserted into the data stream, between the host (e.g., processing system 210) or DDR (e.g., RAM 226 or system memory 216) and the input edge of the compute array 600 as illustrated in FIG. 7.

The buffer/transposer 702 may reformat the data from a host-friendly format (e.g., a row-major order) into a format used by the compute array 600 (e.g., a column-major order). As used herein, column-major order generally refers to consecutive elements of a column in an array residing next to each other, whereas row-major order generally refers to consecutive elements of a row in the array residing next to each other. For example, in a 2×3 array with elements $a_{11}$, $a_{12}$, $a_{13}$, $a_{21}$, $a_{22}$, and $a_{23}$, the column major-order would be $a_{11}$, $a_{21}$, $a_{12}$, $a_{22}$, $a_{13}$, and $a_{23}$, reading down the columns first and then moving from left to right across the rows, whereas the row-major order would be $a_{11}$, $a_{12}$, $a_{13}$, $a_{21}$, $a_{22}$, and $a_{23}$, reading across the rows from left to right first and then moving from top to bottom down the columns.

In this manner, the buffer/transposer 702 may receive a stream of data 704 in the host-friendly format for one matrix (e.g., matrix A) and output a stream of data 706 in the compute-engine friendly format. Such a transpose operation (e.g., row-major to column-major, or to column-major-like for partial column slices) may involve a certain amount of data being buffered so that the reformatted data can be output as a wide word at the speed of the compute array rate of consumption (per clock cycle). For some examples, the buffer/transposer 702 may be implemented in the cache 348 of FIG. 3. Returning To FIG. 7, the other input edge of the compute array 600 may receive a stream of data 708 for another matrix (e.g., matrix B). The stream of data 708 may already be in a compute-engine friendly format and need not be transposed prior to input into the compute array 600. For other examples, a buffer/transposer may operate on matrix B, additionally or alternatively to matrix A.

Since the compute array 600 is massively parallel, the compute array may not process the input data in a linear fashion. For example, parallel matrix multiplication C=A*B may involve matrix A being input into the compute array 600 column by column, or in partial column slices that match the compute array height, in cases where the row size of matrix A is greater than the row size (the height) of the compute array 600.

Figure 8:
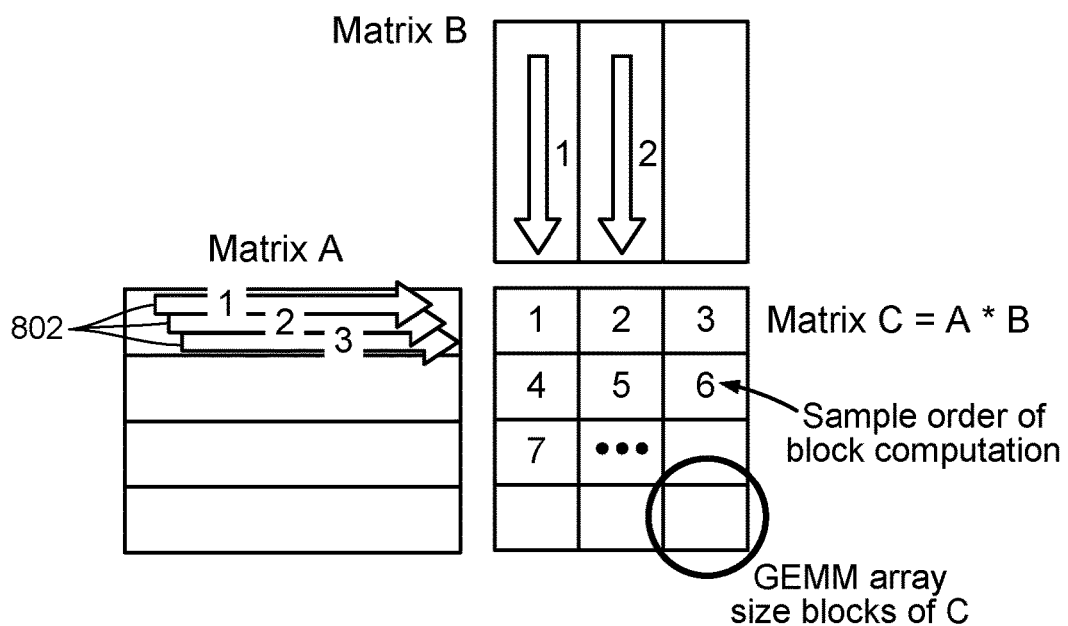
FIG. 8 illustrates block-based matrix multiplication using a buffer, in accordance with an example of the present disclosure.

Examples of the present disclosure may make adjustments to the buffer/transposer 702 such that a block-based GEMM algorithm may fully utilize the buffer/transposer to significantly reduce the input data bandwidth (by several times). A block-based GEMM algorithm may decompose a large matrix multiplication into multiple block multiplications on the compute array 600 as depicted in FIG. 8. In other words, a hierarchical or block-based partitioning may be used to decompose full-size matrix C=A*B as a sequence of several computations (C_block=A_block*B_block) that fit into the compute array 600. This computation sequence may follow the sample order of block computation shown in FIG. 8.

Buffering the first set of rows 802 of matrix A may result in N times lower bandwidth demand on the matrix A data stream for a GEMM problem, where N is the number of horizontal partitions of matrix B in terms of the width of the compute array 600. In the example of FIG. 8, N=3. For some practical applications (e.g., in machine learning), the value of N ranges from tens to hundreds, thus effectively making the matrix A data stream bandwidth negligible in the system.

The buffer/transposer 702 may use multiple instances of local memory (e.g., block random access memory (BRAM)) to load rows 802 and store them as BRAM data 902. The output data may be retrieved column 904 by column, either by multiplexing or BRAM reconfiguration, as shown in the example of FIG. 9.

In this manner, the data transposition may occur naturally, by loading rows 802 from the host or DDR, storing the rows as BRAM data 902, and sending columns 904 into the compute array 600. The parallelism involved to transpose the data may imply minimum buffer sizes. For example, for a DDR interface 512 bits wide, the input of the buffer/transposer 702 may be sixteen 32-bit wide BRAMs, thirty-two 16-bit wide BRAMS, etc. For a thirty-two 16-bit (e.g., short integer (short int)) tall compute array, the output of the buffer/transposer 702 may multiplex the individual BRAMs (as shown by the diagonals 906 in FIG. 9) or reconfigure the width of the BRAMs after being loaded (as data 902), but before being read out (as columns 904).

Figure 9:
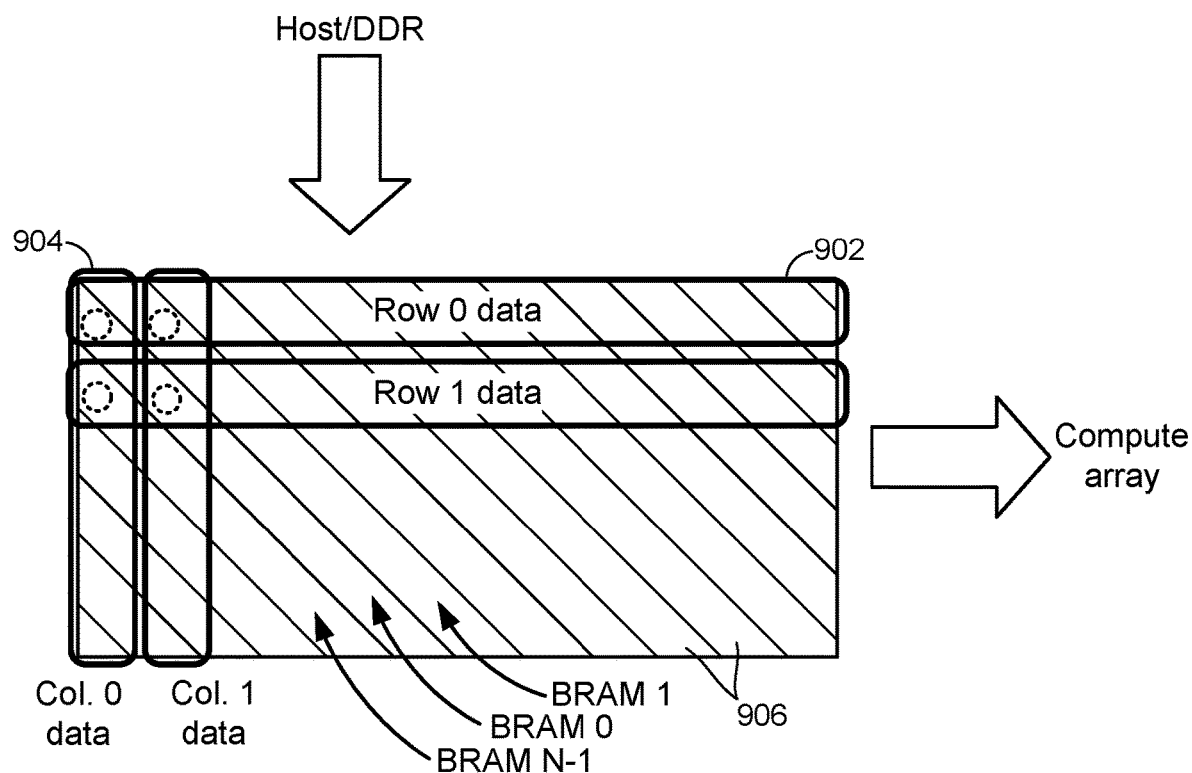
FIG. 9 illustrates using a buffer/transposer implemented with multiple instances of local memory, in accordance with an example of the present disclosure.

To transpose the BRAM data 902 using multiplexing, each of the diagonals 906 in FIG. 9 represents a different BRAM (e.g., BRAM 0, BRAM 1, etc.). Although stored as rows, the BRAM data 902 is fed a column 904 at a time each clock cycle into the compute cores 602 of the compute array 600 (e.g., Column 0 data followed by Column 1 data and so on). Therefore, for a given compute core 602, each data point comes from a different BRAM each clock cycle, and hence, the data is multiplexed from the various BRAMs to that particular compute core in the compute array 600.

For example, in a first clock cycle (in which Column 0 data is read into the compute array 600), a compute core associated with Row 0 data may receive a data point from BRAM 0, whereas a compute core associated with Row 1 data may receive a data point from BRAM N−1, according to the diagonals 906 and the dashed circles in the Column 0 data. In a second clock cycle subsequent to the first clock cycle (in which Column 1 data is read into the compute array 600), the compute core associated with Row 0 data may receive a data point from BRAM 1, whereas the compute core associated with Row 1 data may receive a data point from BRAM 0. Thus, a multiplexer may be used to feed the data points for the Row 0 data from the different BRAMs to a particular compute core, while another multiplexer may be used to feed the data points for the Row 1 data from the different BRAMs to another compute core.

The buffer/transposer block may be software-defined. Therefore, the topology described above may represent only an example of the actual hardware mapping that a hardware compiler may decide to use to satisfy both fast write and read operations. One advantage is that the user need not decide the BRAM/MUX architecture, such that the design may be portable to newer FPGA fabric (assuming the high-level synthesis (HLS) compiler supports the new fabric and is intelligent enough to choose the best mapping). The user may include some guidance (e.g., partitioning or resource mapping pragmas) in an effort to improve the hardware implementation.

Double buffering (i.e., buffering more than one row) may be used to minimize latency by loading the next buffer content while the previous content is being used. Double buffering may be simply expressed in software models as 2× larger vertical dimension (i.e., fora compute array Y elements tall, caching 2Y rows instead of minimal 1 Y).

The software-defined mode may comprise a C++ class with multi-dimensional array and optional compiler specific pragmas or similar controls on how the arrays should be partitioned:

```
template <typename FloatType, int t_CoreWidth, int
   t_Blocks, int t_Depth, int t_RowLength>
class BufTrans
{
public:
  Typedef typename WideFloatType<FloatType, t_Core-
     Width> CoreWideFloatType;
private:
  CoreWideFloatType    m_Buf[t_Blocks]    [t_Depth]
     [t_RowLength];
 . . .
}
``` where t_Blocks controls the vertical buffer size (such as the double buffering above), t_RowLength controls the input parallelism, and t_Depth controls the buffer capacity, which should match or exceed the width of the largest A matrix that the accelerator is designed to support.

The actual writes may occur with a simple member access, such as m_Buf[blockId] [DepthIdx] [rowIdx]=val
and reads and transpositions may occur by setting
val=m_Buf[blockId] [DepthIdx] [rowIdx];

The partitioning of the buffer as in the above three-dimensional (3-D) array in user source code (e.g., C++) may make high-level synthesis more manageable in practice. The alternative of using a single linear array of the same size is theoretically equivalent, but may result in an exponentially harder problem for HLS to schedule.

Examples of the present disclosure address I/O bandwidth issues for a high-speed streaming general-purpose matrix multiplication on a programmable IC (e.g., an FPGA). Examples of the present disclosure increase the effective DDR throughput for streaming data into GEMM DSP engine multifold, as well as eliminate slow data reformatting on a host CPU (e.g., microprocessor 212). This may be accomplished through software-defined (e.g., C++) data structures and access patterns that result in hardware logic that simultaneously buffers and reorganizes the data to achieve linear DDR addressing.

Thus, examples of the present disclosure provide a software-defined block-based buffer/transposer that can be used to convert column-major to row-major-like (or row-major to column-major-like) formats, as well as any of various other suitable custom formats to match the compute array and host data formats. The buffer/transposer may be suitable for use in applications other than GEMM. Examples of the present disclosure provide software-defined GEMM intake bandwidth reduction, as well as hardware resource reuse for buffering and transposing (or other reformatting) functionality. Examples of the present disclosure offer partitioning of the buffer/transposer between high-level user code and an HLS compiler (e.g., Vivado® High-Level Synthesis available from Xilinx, Inc. of San Jose, Calif.). Moreover, examples of the present disclosure may allow for parametrizable intake bandwidth, transpose direction (e.g., row major to column major), and buffer depth (e.g., how may rows of matrix A). Partitioning of the buffer in three dimensions in source code (e.g., C++) may make the high-level synthesis manageable.

Example Operations for Matrix Processing

Figure 10:
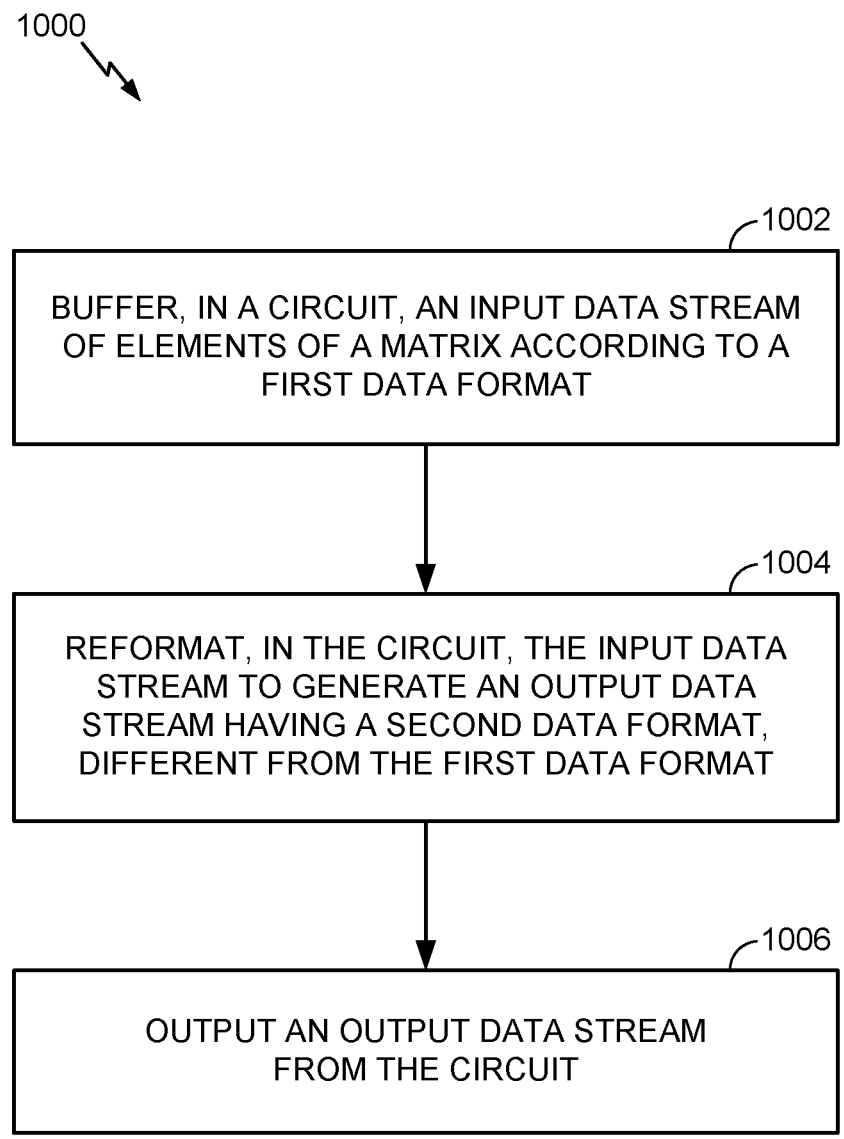
FIG. 10 is a flow diagram of example operations for processing a matrix, in accordance with an example of the present disclosure.

FIG. 10 is a flow diagram of example operations 1000 for processing a matrix, in accordance with an example of the present disclosure. The operations 1000 may be performed, for example, by an electronic circuit, which may include a reformatting circuit (e.g., a buffer/transposer 702). For some examples, the electronic circuit may comprise a hardware accelerator (e.g., hardware accelerator 116) comprising a programmable IC (e.g., programmable IC 228) with a cache 348 implementing the reformatting circuit and with a compute array 362 functioning as a GEMM compute array.

The operations 1000 may begin, at block 1002, with the reformatting circuit buffering an input data stream of elements of the matrix according to a first data format. At block 1004, the reformatting circuit may reformat the input data stream to generate an output data stream having a second data format, different from the first data format. The reformatting at block 1004 may occur concurrently with the buffering at block 1002. At block 1006, the reformatting circuit may output the output data stream.

According to some examples, the circuit comprises a cache (e.g., cache 348) in a programmable IC (e.g., programmable IC 228).

According to some examples, the first data format comprises a row-major order. The second data format may comprise a column-major order. For other examples, the first data format comprises a column-major order, and the second data format comprises a row-major order.

According to some examples, the buffering at block 1002 includes buffering a plurality of rows of the matrix. In this case, the outputting at block 1006 may entail outputting at least a portion of each of a plurality of columns of the matrix as the output data stream having the second data format. For some examples, the output data stream is configured for output to a compute array (e.g., compute array 600), and a height of the at least the portion of each of the plurality of columns is equal to a row size of the compute array. In this manner, output of the output data stream from the circuit may be at a speed matching a rate of consumption by the compute array. For some examples, a number of the buffered rows of the matrix is configurable (e.g., software-defined as a variable).

According to some examples, the buffering at block 1002 includes storing the input data stream into a plurality of block random access memory (BRAM) blocks. For some examples, the reformatting at block 1004 entails multiplexing the plurality of BRAM blocks to generate the output data stream.

According to some examples, the compute array implements one or more layers of a neural network (e.g., a convolutional neural network).

According to some examples, the matrix is a weight matrix. For other examples, the matrix is an input data matrix, which may include an image matrix, voice samples, or channels of data from activation functions of a previous neural network layer. In some examples of neural network processing (e.g., CNN), the weight matrix (e.g., matrix A) is the same for the duration of processing input images streamed as matrix B. Thus, buffering the matrix A may completely eliminate the bandwidth needed for streaming matrix A. The "A matrix" may be a single matrix or more typically a small set of matrices (e.g., one per CNN layer).

According to some examples, the buffering at block 1002 may include storing the input data stream into a plurality of BRAM blocks. In this case, the reformatting at block 1004 may involve reconfiguring a width of the plurality of BRAM blocks, and the outputting at block 1006 may entail accessing the stored input data stream in the plurality of BRAM blocks having the reconfigured width to generate the output data stream.

According to some examples, the buffered matrix comprises a weight matrix of a compute system that reuses the weight matrix for multiple computation steps.

Examples of the present disclosure address I/O bandwidth issues for a high-speed streaming general-purpose matrix multiplication on a programmable IC (e.g., an FPGA). Examples of the present disclosure increase the effective DDR throughput for streaming data into GEMM DSP engine multifold, as well as eliminate slow data reformatting on a host CPU (e.g., microprocessor 212). This may be accomplished through software-defined (e.g., C++) data structures and access patterns that result in hardware logic that simultaneously buffers and reorganizes the data to achieve linear DDR addressing.

As used herein (including the claims that follow), a phrase referring to "at least one of" a list of items refers to any combination of those items, including single members. As an example, "at least one of: x, y, and z" is intended to cover: x, y, z, x-y, x-z, y-z, x-y-z, and any combination thereof (e.g., x-y-y and x-x-y-z).

While the foregoing is directed to examples of the present disclosure, other and further examples of the disclosure may be devised without departing from the basic scope thereof, and the scope thereof is determined by the claims that follow.

What is claimed is:

1. A method for processing a matrix in hardware, comprising:
   buffering, during a first time period, a first set of rows of the matrix according to a row-major data format into memory instances of a circuit, wherein the first set is one of a plurality of sets of rows of the matrix and each of the plurality of sets of rows of the matrix comprises at least one row of the matrix;
   reformatting, in the circuit, the first set of rows of the matrix to generate an output data stream having a column-major data format, wherein the reformatting occurs concurrently with the buffering, wherein the output data stream comprises columns, wherein the reformatting comprises multiplexing the memory instances by retrieving data points from each of the first set of rows to form the columns of the output data stream, wherein each data point is buffered into a different memory instance, wherein each of the different memory instances comprises one or more random access memory (RAM) blocks; and
   outputting the output data stream from the circuit.

2. The method of claim 1, wherein the circuit comprises a cache in a programmable integrated circuit (IC).

3. The method of claim 1, wherein the buffering comprises storing the first set of rows of the matrix.

4. The method of claim 3, wherein the outputting comprises outputting at least a portion of each of the columns of the matrix as the output data stream having the column-major data format.

5. The method of claim 4, wherein:
   the output data stream is configured for output to a compute array; and
   a height of the at least the portion of each of the columns is equal to a row size of the compute array for output of the output data stream from the circuit at a speed matching a rate of consumption by the compute array.

6. The method of claim 5, wherein the compute array implements one or more layers of a convolutional neural network and wherein the matrix comprises a weight matrix or an input activation matrix.

7. The method of claim 3, wherein a number of the buffered first set of rows of the matrix is configurable.

8. The method of claim 1, wherein: the memory instances comprise a plurality of block random access memory (BRAM) blocks.

9. The method of claim 1, wherein:
   the memory instances comprise a plurality of block random access memory (BRAM) blocks;
   the reformatting comprises reconfiguring a width of the plurality of BRAM blocks; and
   the outputting comprises accessing the buffered first set of rows of the matrix in the plurality of BRAM blocks having the reconfigured width to generate the output data stream.

10. An electronic circuit comprising:
    a reformatting circuit; and
    a compute circuit comprising a compute array, wherein an input of the compute array is coupled to an output of the reformatting circuit and wherein the reformatting circuit is configured to:
    buffer a first set of rows of a matrix during a first time period according to a row-major data format into memory instances of the reformatting circuit, wherein the first set is one of a plurality of sets of rows of the matrix and each of the plurality of sets of rows of the matrix comprises at least one row of the matrix;
    reformat the first set of rows of the matrix to generate an output data stream having a column-major data format, wherein the reformatting is configured to occur concurrently with the buffering, wherein the output data stream comprises columns, wherein the reformatting comprises multiplexing the memory instances by retrieving data points from each of the first set of rows to form the columns of the output data stream, wherein each data point is buffered into a different memory instance, wherein each of the different memory instances comprises one or more random access memory (RAM) blocks; and
    output the output data stream to the compute array.

11. The electronic circuit of claim 10, wherein the electronic circuit comprises a programmable integrated circuit (IC) and wherein the reformatting circuit comprises a cache in the programmable IC.

12. The electronic circuit of claim 10, wherein the reformatting circuit is configured to buffer the first set of rows of the matrix by storing a plurality of rows of the matrix.

13. The electronic circuit of claim 12, wherein the reformatting circuit is configured to output the output data stream by outputting at least a portion of each of the columns of the matrix as the output data stream having the column-major data format.

14. The electronic circuit of claim 13, wherein a height of the at least the portion of each of the columns is equal to a row size of the compute array for output of the output data stream from the reformatting circuit at a speed matching a rate of consumption by the compute array.

15. The electronic circuit of claim 12, wherein a number of the buffered first set of rows of the matrix is configurable.

16. The electronic circuit of claim 10, wherein: the local memory instances comprise a plurality of block random access memory (BRAM) blocks and is configured to buffer the first set of rows of the matrix by storing the first set of rows of the matrix in the plurality of BRAM blocks.

17. The electronic circuit of claim 10, wherein the compute array implements one or more layers of a convolutional neural network and wherein the matrix comprises a weight matrix or an input activation matrix.

18. An apparatus for processing a matrix, comprising:
    a plurality of memory instances for buffering a first set of rows of the matrix during a first time period according to a row-major data format, wherein the first set is one of a plurality of sets of rows of the matrix; and
    a transposer for reformatting the first set of rows of the matrix to generate an output data stream having a column-major data format, wherein the output data stream comprises columns, wherein the reformatting comprises multiplexing the plurality of memory instances by retrieving data points from each of the first set of rows to form the columns of the output data stream, wherein each data point is buffered into a different memory instance, wherein each of the different memory instances comprises one or more random access memory (RAM) blocks, wherein the transposer is configured to operate concurrently with the plurality of local memory instances, and wherein the transposer is configured to output the output data stream.

19. The method of claim 1, wherein buffering the first set of rows of the matrix into the memory instances of the circuit comprises buffering each data point of each row of the first set of rows of the matrix into a different memory instance.

20. The electronic circuit of claim 10, wherein the reformatting circuit is configured to buffer the first set of rows of the matrix into the memory instances of the circuit by buffering each data point of each row of the first set of rows of the matrix into a different memory instance.

\* \* \* \* \*

UNITED STATES PATENT AND TRADEMARK OFFICE
CERTIFICATE OF CORRECTION

PATENT NO. : 11,036,827 B1  Page 1 of 1
APPLICATION NO. : 15/786346
DATED : June 15, 2021
INVENTOR(S) : Jindrich Zejda It is certified that error appears in the above-identified patent and that said Letters Patent is hereby corrected as shown below:

In the Claims

Column 16, Line 38, In Claim 16, after "the" delete "local"

Column 16, Line 64, In Claim 18, after "of" delete "local"

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*